US006811011B2

(12) United States Patent  
Bastien

(10) Patent No.: US 6,811,011 B2
(45) Date of Patent: Nov. 2, 2004

(54) DUST SEAL

(75) Inventor: Charles M. Bastien, River Falls, WI (US)

(73) Assignee: Horton, Inc., Minneapolis, MN (US)

( * ) Notice: Subject to any disclaimer, the term of this patent is extended or adjusted under 35 U.S.C. 154(b) by 0 days.

(21) Appl. No.: 10/296,019

(22) PCT Filed: May 30, 2002

(86) PCT No.: PCT/US01/17455

§ 371 (c)(1),
(2), (4) Date: Nov. 14, 2002

(87) PCT Pub. No.: WO01/92765

PCT Pub. Date: Dec. 6, 2001

(65) Prior Publication Data

US 2004/0032091 A1 Feb. 19, 2004

Related U.S. Application Data

(60) Provisional application No. 60/208,147, filed on May 31, 2000.

(51) Int. Cl.$^7$ .................................................. F16J 9/20
(52) U.S. Cl. ..................... 192/85 A; 192/112; 251/214; 277/647
(58) Field of Search ........................ 192/59, 66.1, 85 A, 192/112; 277/530, 531, 567, 644, 647; 251/214

(56) References Cited

U.S. PATENT DOCUMENTS

| | | | |
|---|---|---|---|
| 3,580,588 A | 5/1971 | Allen et al. .................... 277/32 |
| 3,753,479 A | 8/1973 | William ........................ 192/89 |
| 4,247,246 A | 1/1981 | Abe et al. ..................... 415/53 |
| 4,427,102 A | 1/1984 | Schilling ..................... 192/85 |
| 4,645,432 A | 2/1987 | Tata ............................ 417/420 |
| 4,657,126 A | 4/1987 | Hanks et al. ............. 192/48.91 |
| 4,658,847 A * | 4/1987 | McCrone ..................... 137/72 |
| 4,877,117 A | 10/1989 | Kniebel et al. ............... 192/85 |
| 4,913,258 A | 4/1990 | Sakurai et al. ............. 180/242 |
| 4,949,981 A | 8/1990 | Nagashima ................. 277/37 |
| 4,955,793 A | 9/1990 | Caoduro ................ 417/423.11 |
| 5,031,923 A | 7/1991 | Davies ........................ 277/124 |
| 5,059,161 A | 10/1991 | Bredt ......................... 475/269 |
| 5,111,093 A | 5/1992 | Tanaka ........................ 310/88 |
| 5,257,682 A | 11/1993 | Kuroki ........................ 192/88 |
| 5,497,869 A | 3/1996 | Muirhead et al. ............. 192/84 |
| 5,704,461 A | 1/1998 | Vatsaas et al. ................ 192/85 |
| 5,779,579 A | 7/1998 | Miyagi et al. ................ 474/72 |
| 5,937,979 A | 8/1999 | Cummings ................... 192/18 |
| 5,984,316 A | 11/1999 | Balsells ...................... 277/553 |
| 5,997,003 A * | 12/1999 | Turner ........................ 277/339 |
| 6,003,876 A | 12/1999 | Yamagishi et al. ......... 277/407 |
| 6,302,402 B1 * | 10/2001 | Rynders et al. ............. 277/530 |

* cited by examiner

Primary Examiner—Saul Rodriguez
(74) Attorney, Agent, or Firm—Kinney & Lange, P.A.

(57) ABSTRACT

A dust seal is disposed in a rotational control apparatus for sealing a pressurized chamber, such as a pressure chamber in a pneumatic on/off fan clutch. The dust seal is an annular elastomeric member disposed between first and second members rotating about a first axis. The seal is for sealing against ingress of foreign matter into a pressure chamber that is formed between the first and second members, wherein the first member has an annular extension and the second member has a radially extending surface. The seal comprises a center base section having a first side and a second side, a radially inner upright section and a radially outer upright section. The radially inner upright section extends generally perpendicularly from the first side of the center base section and the radially outer upright section extends from the first side of the center base section at an acute angle relative to the center base section. The center base section, the inner upright section and the outer upright section collectively form a generally U-shape in radial cross section.

32 Claims, 8 Drawing Sheets

DUST SEAL

CROSS-REFERENCE TO RELATED APPLICATION(S)

This application claims priority from (1) U.S. Provisional Patent Application Ser. No. 60/208,147 that was filed on May 31, 2000; and (2) PCT International Application Number PCT/US01/17455 that was filed on May 30, 2002.

BACKGROUND OF THE INVENTION

This invention relates to a rotational control apparatus, such as a pneumatic on/off fan clutch and, more particularly to a dust seal design which serves to limit the exposure of the fan clutch to moisture and other environmental contaminates.

Common cooling systems for use in diesel engines such as over-the-road trucks, off-road equipment and agricultural equipment include a spring-bias or air-engaged on/off fan clutch for selective cooling fan operation. Typically, an on/off fan clutch is mounted to the front of the engine block and the clutch is belt-driven by the crank shaft pulley. Electronic control of such engines is now fairly standard so that, based on a signal from the engine's electronic control module (ECM), the fan clutch is activated to turn the cooling fan on and off. A typical diesel engine heat exchange (cooling) system includes an on/off fan clutch, a solenoid valve, a cooling fan and a fan shroud, and operates in conjunction with engine coolant, charge air and air conditioning systems. Such heat exchange systems may also be used in conjunction with transmission cooling and hydraulic cooling systems. Fan clutches of this type shown in U.S. Pat. Nos. 3,253,687, 4,425,993, 4,657,126 and 5,704,461 have proven to provide precise power, exceptional economy and dependable, long lived durability.

The operational environment for a fan clutch is an extreme and unfriendly one. The engine and adjacent systems may be operated for long periods of time, in high heat conditions (or even extreme cold conditions). In addition, conditions may be quite dirty, dusty and the system can be exposed to significant amounts of moisture in use. It is therefore quite important to prevent contamination of the operable components of a fan clutch from such adverse atmospheric conditions and contaminants.

U.S. Pat. No. 5,704,461 discloses a rotational control apparatus, which relates specifically to fan clutches, having O-rings between relatively moveable components for sealing engagement to prevent fluid pressure from escaping. Standard elastomeric O-ring seals have proved inadequate for such purposes, in that their very exposure to such contaminants can result in deterioration of an O-ring seal in an accelerated manner, thereby leading to failure and the necessity for earlier replacement of the seal.

Seals with varying cross-sectional shapes such as "S-shaped" and "U-shaped" have been disclosed in U.S. Pat. Nos. 5,111,093; 5,257,682; and 6,003,876. In particular, U.S. Pat. No. 5,257,682 to Kuroki utilizes seals of various sizes and shapes in a hub clutch assembly for a vehicle which engages and disengages a drive axle relative to a wheel. The Kuroki patent shows a U-shaped seal configured such that the inner portion of the "U" envelopes a member, thereby creating an on/off valve in cooperation with an actuator that engages and disengages the seal. Although the Kuroki patent provides a seal capable of preventing pressure leakage from an actuator valve when the actuator is engaged with the seal, the Kuroki seal is not a permanent seal which limits exposure of a pressure chamber in a rotational control apparatus to moisture and other environmental contaminates.

BRIEF SUMMARY OF THE INVENTION

The present invention is an annular seal disposed about a common axis between first and second rotatably opposed members. The seal is for sealing against ingress of foreign matter into a pressure chamber that is formed between the first and second members, wherein the first member has an annular extension and the second member has a radially extending surface. The seal comprises a center base section having a first side and a second side. A radially inner upright section extends generally perpendicularly from the first side of the center base section. The inner upright section has a first side, which generally faces the first side of the center base section and a second side, which generally faces away from the first side of the center base section. The seal also has a radially outer upright section extending from the first side of the center base section. The outer upright section is aligned at an acute angle relative to the center base section. The outer upright section has a first side, which generally faces the first side of the center base section and a second side, which generally faces away from the first side of the center base section. The first side of the center base section, the first side of the inner upright section and the first side of the outer upright section collectively form a generally U-shape in radial cross section. The second side of the center base section is in contact with the radially extending surface of the second member, while the first side of the center base section, the first side of the inner upright section and the first side of the outer upright section are in contact with the annular extension of the first member.

BRIEF DESCRIPTION OF THE DRAWINGS

The present invention will be further explained with reference to the attached figures, wherein like structure is referred to by like numerals throughout the several views.

While the above-identified drawing figures set forth one preferred embodiment of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention.

DETAILED DESCRIPTION

Figure 1:
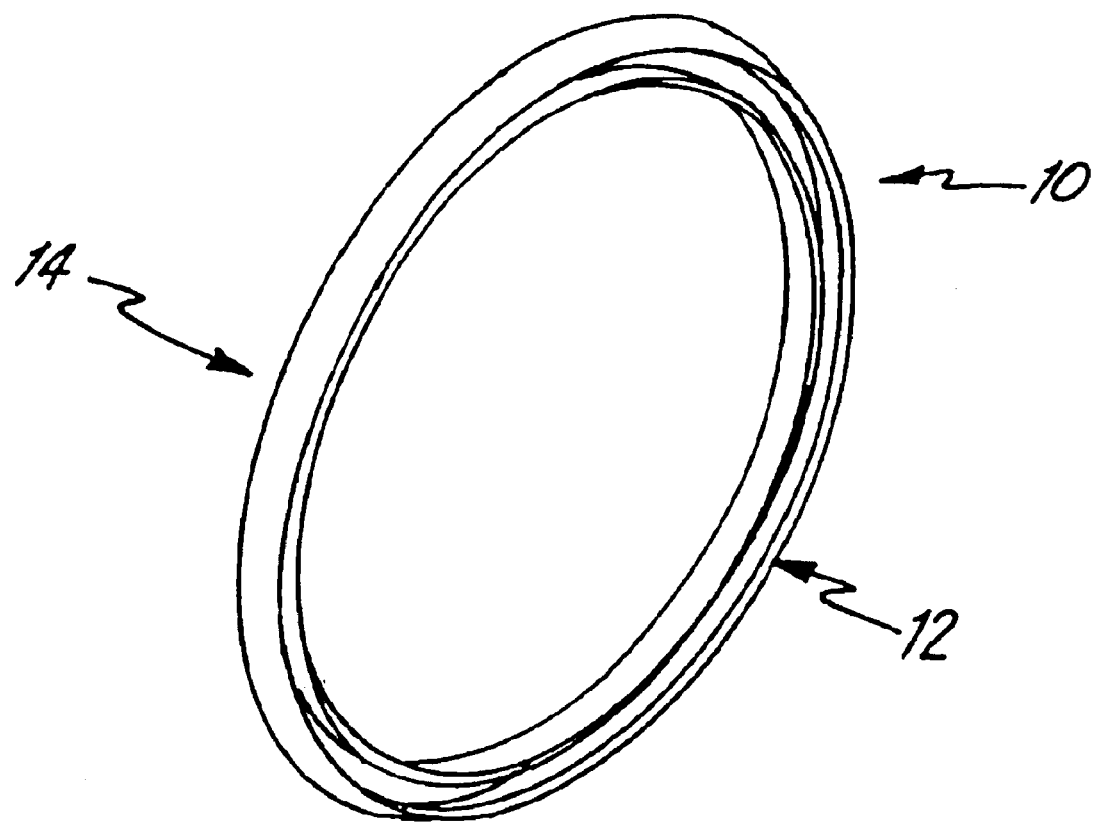
FIG. 1 is a perspective view of the inventive dust seal.

The present invention is a dust seal shown at 10 in FIG. 1. The dust seal 10 is for sealing a pressurized chamber in a rotational control apparatus, such as a pressure chamber in a pneumatic on/off fan clutch. The dust seal 10 is an annular elastomeric member, which is generally U-shaped, having a front face 12 and a rear face 14. The dust seal 10, shown in FIGS. 1–4, is illustrated independently from the fan clutch components shown in FIGS. 5–8.

Figure 2:
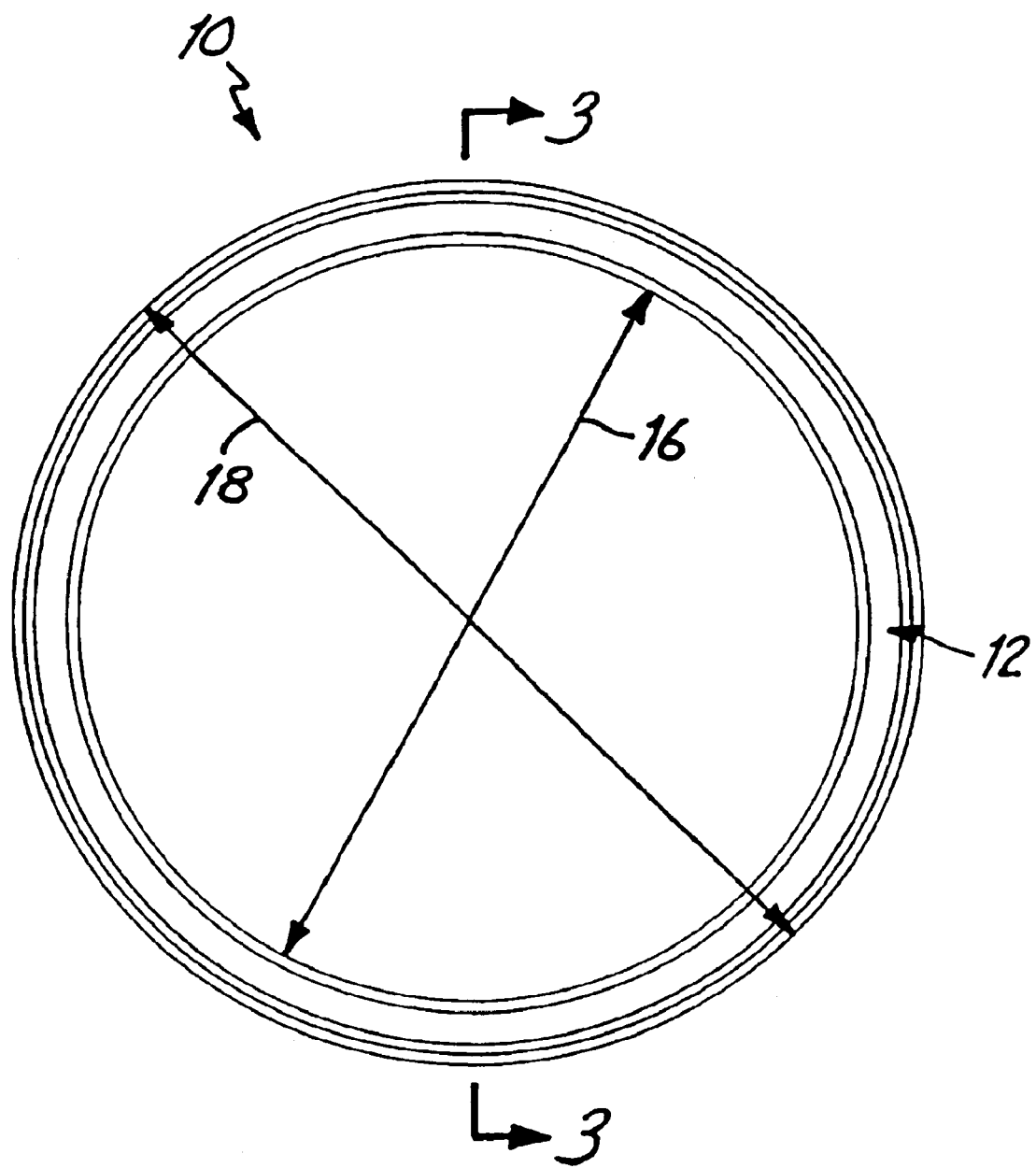
FIG. 2 is a front elevational view of the inventive dust seal.

FIG. 2 shows the front face 12 of the dust seal 10. The dust seal 10 has an inner diameter 16 and an outer diameter 18. In the preferred embodiment, the inner diameter 16 is approximately 4.725 inches and the outer diameter 18 is approximately 5.5 inches. Although the inner and outer diameters 16, 18 of the dust seal 10 are given, other embodiments would utilize other dimensions.

Figure 3:
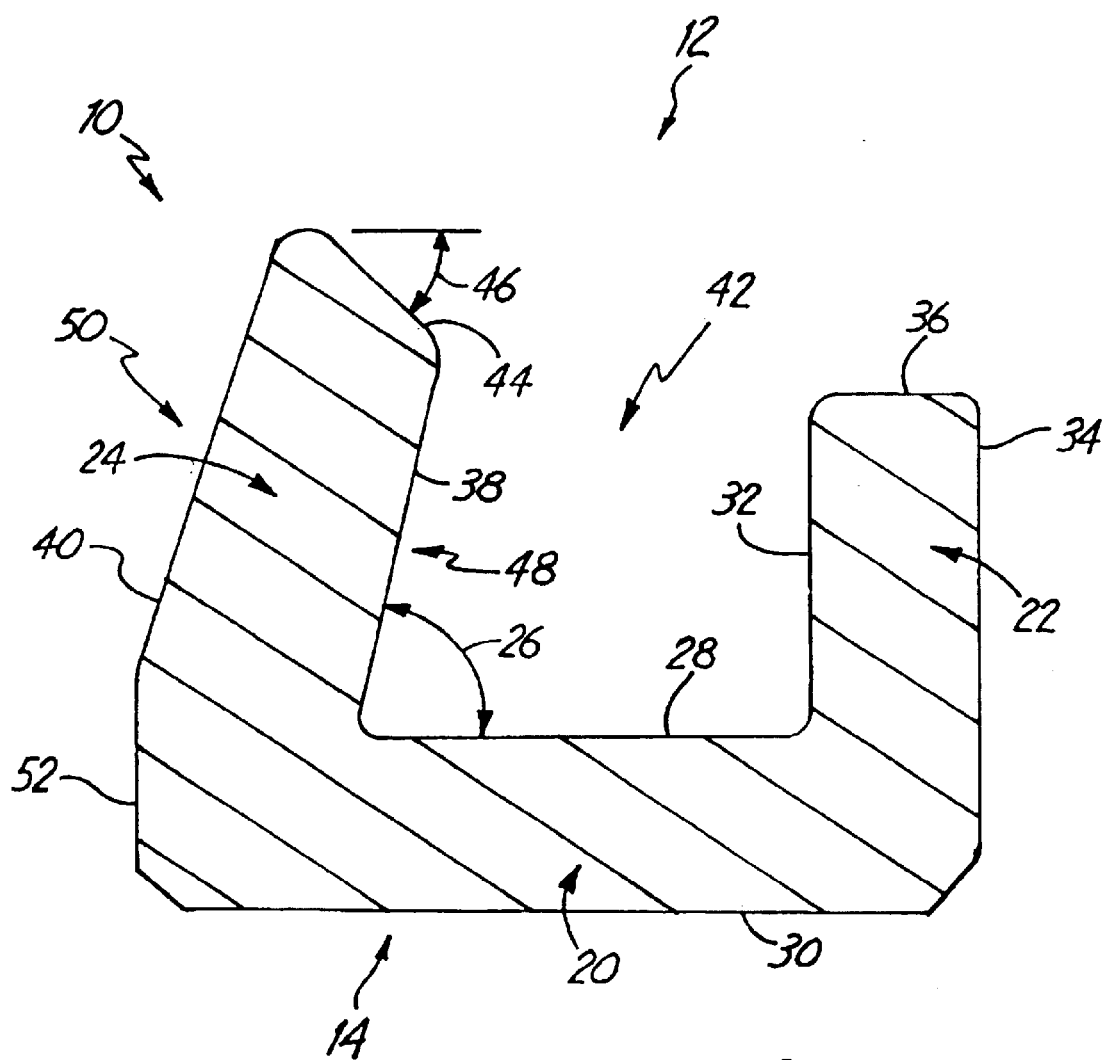
FIG. 3 is an enlarged sectional view as taken along lines 3—3 of FIG. 2.

FIG. 3 is a cross-sectional view of the dust seal 10 taken along line 3—3 of FIG. 2. The dust seal 10 has a generally U-shaped radial cross section, formed from a center base section 20, a radially inner upright section 22 and a radially outer upright section 24. The center base section 20 and inner upright section 22 are generally aligned perpendicularly, while the outer upright section 24 is aligned at an acute angle 26 relative to the center base section 20. In the preferred embodiment, the outer upright section 24 is approximately 0.325 inches in radial length, the inner upright section 22 is approximately 0.245 inches in radial length and the acute angle 26 is aligned at approximately 70° with respect to the center base section 20. Although the inner upright section 22 and outer upright section 24 dimensions and the degree of the acute angle 26 of the dust seal 10 are given, other embodiments would utilize other dimensions and angle of degrees.

The center base section 20, the inner upright section 22 and the outer upright section 24 are integrally formed from a flexible polymeric material. Preferably, the polymeric material is polyurethane, and most preferably Estane 58130 polyurethane, available from BF Goodrich of Charlotte, N.C. In the preferred embodiment, the ratio of the radial width of the dust seal 10 along its center base section 20 relative to the radius of the seal, as measured to its outer most radial extent or outer diameter 18, is about 1:7. Also preferably, the ratio of the axial height or the radial length of the outer upright portion 24 of the dust seal 10 relative to the outer diameter 18 of the seal is about 1:17.

The center base section 20 has a first side 28 and a second side 30. The inner upright section 22 extends substantially perpendicularly from the first side 28 of the center base section 20. The inner upright section 22 has a first side 32, which generally faces the first side 28 of the center base section 20 and a second side 34, which generally faces away from the first side 28 of the center base section 20. In the preferred embodiment, the inner upright section 22 has a first end 36 which is a generally annular face that is substantially parallel to the first side 28 of the center base section 20.

The outer upright section 24 extends from the first side 28 of the center base section 20 and aligned at an acute angle 26 relative to the center base section 20. The outer upright section 24 has a first side 38, which generally faces the first side 28 of the center base section 20 and a second side 40, which generally faces away from the first side 28 of the center base section 20.

Figure 4:
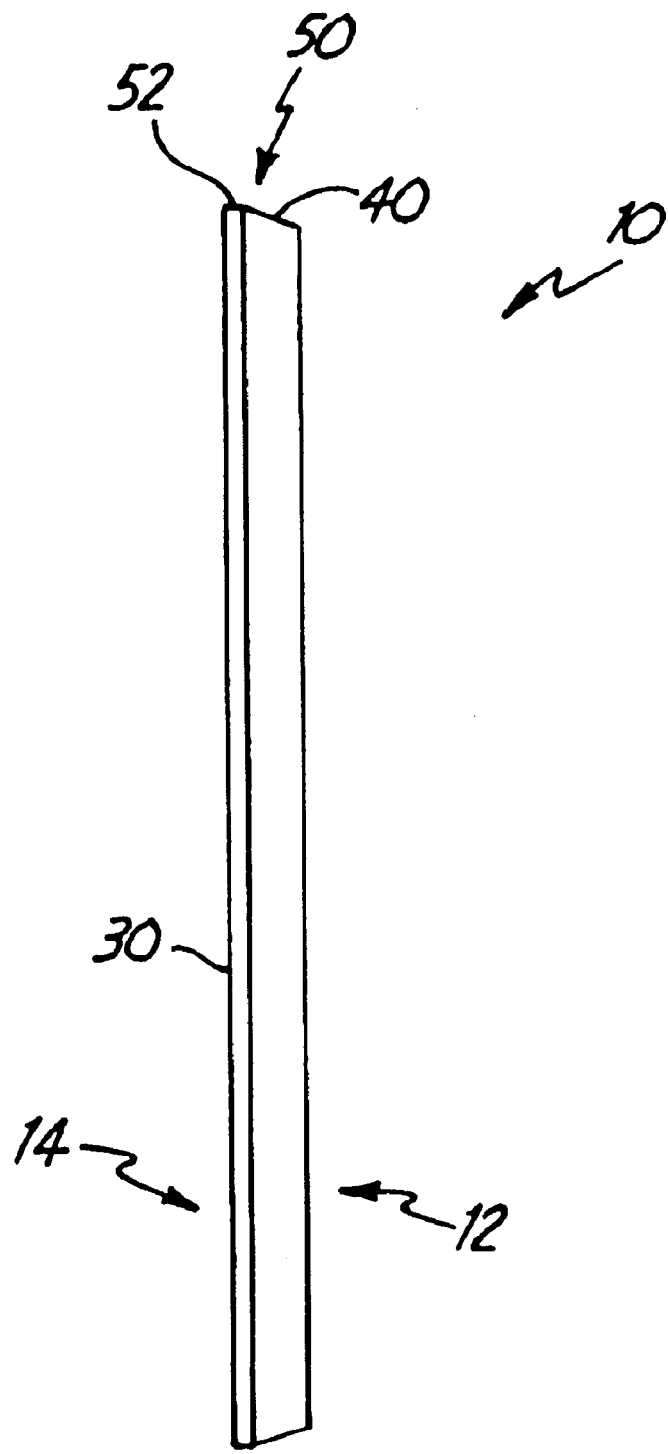
FIG. 4 is a side elevational view of the inventive dust seal.

In a preferred embodiment, shown in FIG. 3, the first side 28 of the center base section 20, the first side 32 of the inner upright section 22 and the first side 38 of the outer upright section 24 collectively form a generally U-shape 42 in radial cross section. As can be seen in FIG. 3, the outer upright section 24 extends farther away from the center base section 20 than the inner upright section 22. Also, in the preferred embodiment, the outer upright section 24 has a second end 44 which is a generally annular face aligned at an acute angle 46 relative to the center base section 20. Even more preferable, the outer upright section 24 is thicker in cross section adjacent the center base section 20. As shown in FIG. 3, the outer upright section 24 has an inner face 48 and an outer face 50. In the preferred embodiment, the outer face 50 has a rim portion 52 adjacent the center base section 20 which extends substantially perpendicularly to the second side 30 of the center base section 20, as shown in FIGS. 3 and 4.

Figure 5:
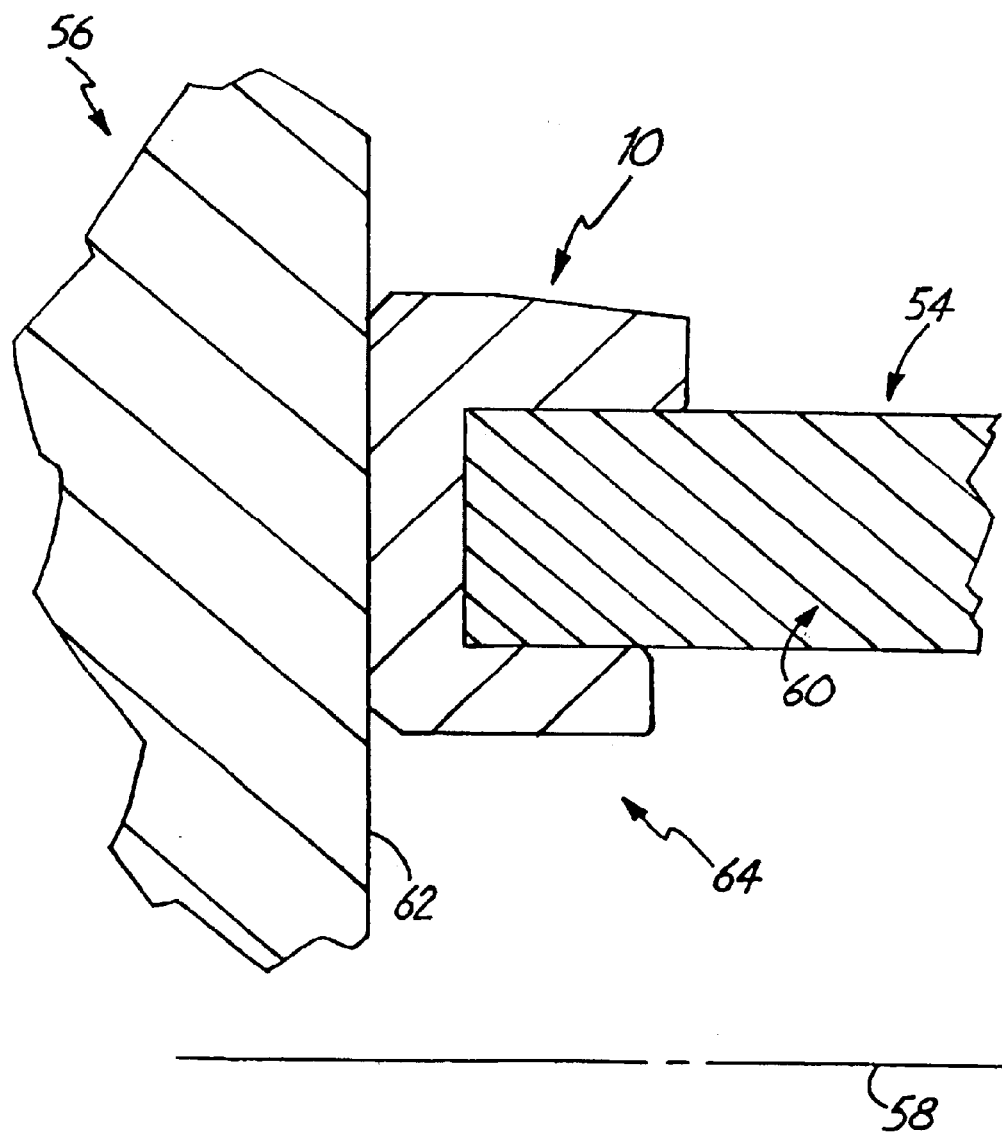
FIG. 5 is an enlarged sectional view of the inventive dust seal disposed between a first member and a second member.

As shown in FIG. 5, the inventive dust seal 10 is for incorporation into any rotational control apparatus having a first member 54 and a second member 56 rotating about a first axis 58, wherein the first member 54 has an annular extension 60 and the second member 56 has a radially extending surface 62. The dust seal 10 is disposed between the first and second members 54, 56 for sealing therebetween against ingress of foreign matter into a chamber 64 formed between the first and second members 54, 56. As can be seen in FIG. 5, the second side of the center base section is in contact with the radially extending surface 62 of the second member 56, whereas the first side 28 of the center base section 20, the first side 32 of the inner upright section 22 and the first side 38 of the outer upright section 24 are in contact with the annular extension 60 of the first member 54.

Figure 6:
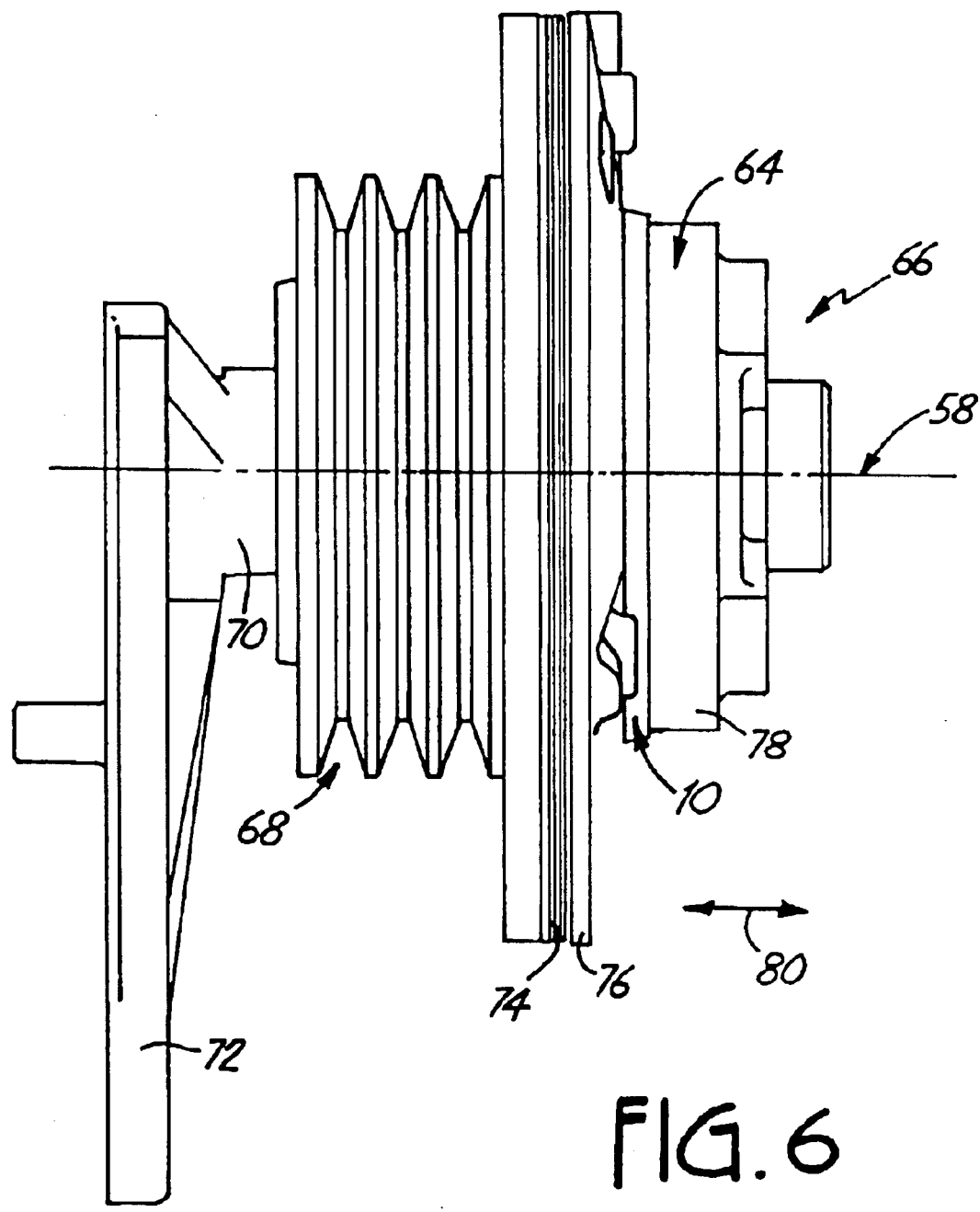
FIG. 6 is a side elevational view of an on/off pneumatic fan clutch including the dust seal of the present invention.

In a preferred embodiment the dust seal 10 is incorporated into a on/off pneumatic fan clutch 66 shown in FIG. 6. Although the dust seal 10 is shown with reference to the on/off pneumatic fan clutch 66 shown in FIG. 6, other embodiments would incorporate the dust seal 10 into other fan clutches and even into remanufactured fan clutches. The fan clutch 66 has a sheave 68, which is coupled by a drive belt (not shown) to an engine drive train (not shown). The sheave 68 is rotatably mounted about a spindle 70 which is supported by an engine mount 72 which in turn is mounted to the vehicle's engine (not shown). The sheave 68 is rotatably supported on bearings (not shown in FIG. 6) on the spindle 70. A friction plate 74 is connected to the sheave 68 for coupled rotation therewith. A piston friction disk 76 is also rotatably supported about the spindle 70 by bearings (not shown in FIG. 6) to selectively engage the friction plate 74. A cover assembly 78 is connected to the piston friction disk 76 for coupled rotation therewith about the first axis 58 yet mounted relative to the piston friction disk 76 for axial movement therebetween. The piston friction disk 76 is axially moveable relative to the friction plate 74 (in direction of arrows 80 in FIG. 6). A pneumatic cover assembly 78 defines therein a pressure chamber 64 for use in causing axial movement of the piston friction disk 76. The cover assembly 78 is fixed in axial position relative to the spindle 70, the sheave 68 and the friction plate 74. The piston friction disk 76 is moveable axially between the cover assembly 78 and friction plate 74. The inventive dust seal 10 is generally disposed between the cover assembly 78 and piston friction disk 76.

Figure 7:
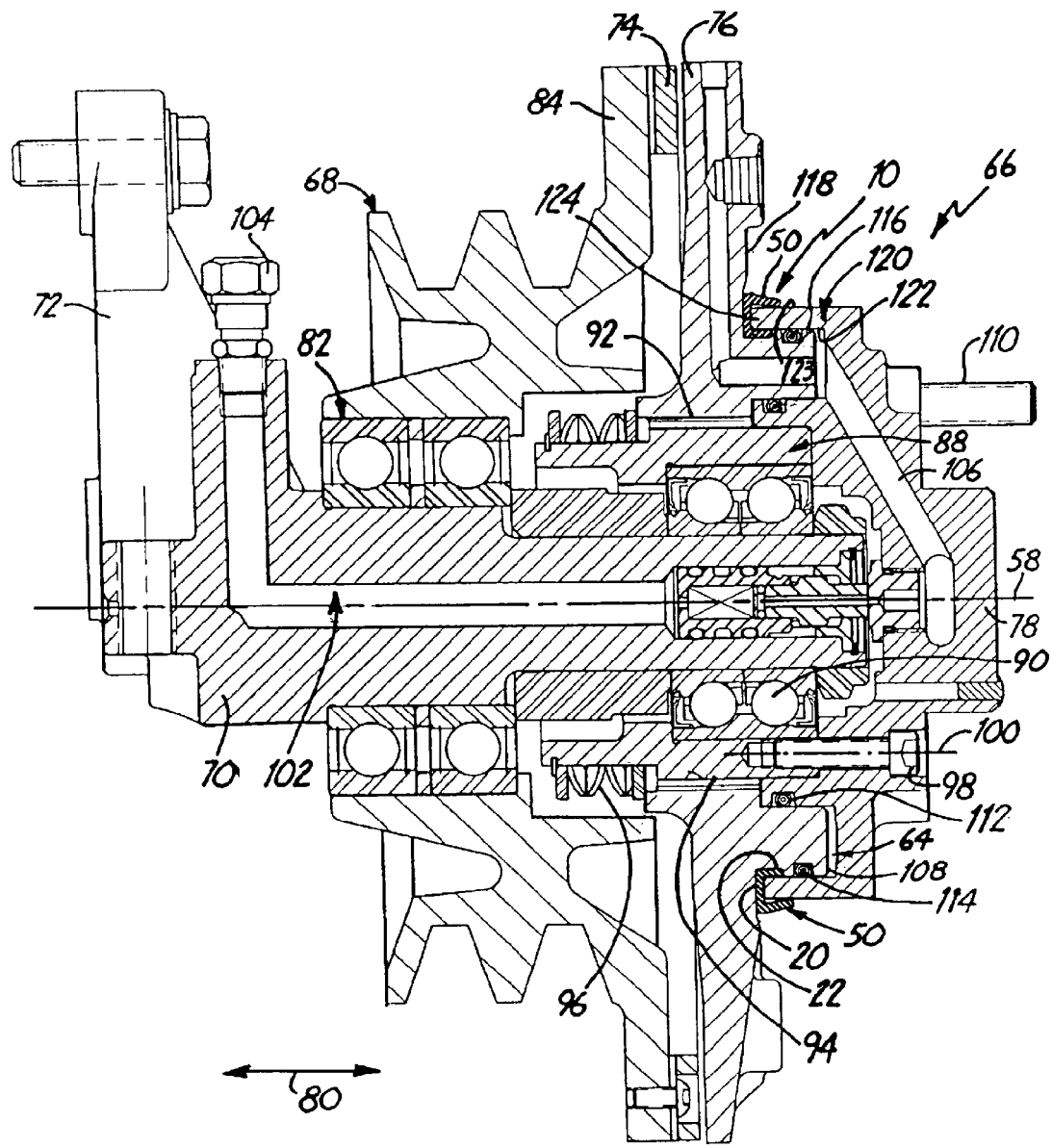
FIG. 7 is a side sectional view of another version of a pneumatic on/off fan clutch employing the dust seal of the present invention.

The relationship of components in a typical on/off pneumatic fan clutch 66 is illustrated more specifically in the sectional view of FIG. 7, with respect to fan clutch 66. A sheave 68 is rotatably mounted about a spindle 70 by bearings 82, and the spindle 70 is in turn connected to an engine mount 72. One end 84 of the sheave 68 is enlarged and has an annular friction plate 74 affixed thereto. The sheave 68 and friction plate 74 thus rotate about the spindle 70 in coupled relationship. A hub 88 is rotatably mounted about the spindle 70 by bearings 90. The piston friction disk 76 is rotatably mounted about the hub 88. The piston friction disk 76 has torque transmitting surfaces in the form of internal splines 92 which engage with the external torque transmitting surfaces in the form of splines 94 of the hub 88. The internal splines 92 of the piston friction disk and external splines 94 of the hub 88 permit such axial movement but maintain the rotational coupling of the friction plate 74 and cover assembly 78.

The piston friction disk 76 is axially moveable relative to the spindle 70 in direction of the arrows 80, but is biased away from the friction plate 74 by means of springs 96 or other suitable biasing components. A cover assembly 78 is mounted over the piston friction disk 76. The cover assembly 78 is secured to the hub 88 by means of a multiplicity of spaced bolts 98 with extend through clearance holes 100 in the hub 88. The bearings 90 also support the cover assembly 78 for rotation about the spindle 70.

An air channel 102 extends through the spindle 70 from a pneumatic fitting 104 at the proximal end of the spindle 70 adjacent the engine mount 72 to its distal end (cover assembly 78). The air channel 102 communicates with an air channel 106 in the cover assembly 78 which, in turn, communicates with the annular pressure chamber 64 disposed between the cover assembly 78 and an opposed surface 108 of the piston friction disk 76. Pressurized air is introduced into the pressure chamber 64 via channels 102 and 106. When the pressure is sufficient to overcome the bias of the biasing components, the piston friction disk 76 moves axially toward (and into engagement with) the friction plate 74. A cooling fan (not shown) is mounted to the cover assembly 78, typically using a plurality of studs 110 (only one of which is shown in FIG. 2). In use, the engine drive belt rotates the sheave 68, thereby rotating the friction plate 74. When the piston friction disk 76 is engaged with the friction plate 74, the piston friction disk 76 rotates with the friction plate 74 in coupled relationship. The rotating piston friction disk, in turn, rotates the hub 88, which rotates the cover assembly 78 having the fan blades mounted thereon.

The pressure chamber 64 is sealed between opposed moving portions of the cover assembly 78 and the piston friction disk 76 by annular elastomeric seals 112 and 114 (e.g., O-rings). The seal 114 moisture, contaminants, etc.). In order to provide further sealing of the opposed moving portions of the cover assembly 78 and piston friction disk 76 and protection of the O-rings 112 and 114 from contamination, the inventive dust seal 10 is provided between the cover assembly 78 and the piston friction disk 76. By sealing the pressure chamber 64 and protecting the O-rings 112, 114 from contamination, the dust seal 10 serves a lubrication retention function for the O-rings 112, 114 and other operable components of the fan clutch 66.

As best seen in FIG. 7, the piston friction disk 76 has a sealing area thereon defined by a circumferentially extending sealing surface 116 and an adjacent radially extending sealing surface 118. The circumferentially extending sealing surface 116 has an annular recess for O-ring 114. The cover assembly 78 has an annular extension 120 thereon which has an inner circumferential face 122, an outer circumferential face 123 and a radially extending end face 124. The piston friction disk 76 and cover assembly 78 interface is defined by the inner circumferential face 122 of the cover assembly 78 extending over in a sealed relationship (via seal 114) with the circumferential extending sealing surface 116 of the piston friction disk 76 and the end face 124 of the annular extension 120 abutting the radially extending sealing surface 118.

The dust seal 10 is disposed between the piston friction disk 76 and cover assembly 78 interface. The center base section 120 of the dust seal 10 is disposed between the end face 124 of the annular extension 120 of the cover assembly 78 and the radially extending sealing surface 118 of the piston friction disk 76. The inner upright section 22 of the dust seal 10 is disposed between the inner circumferential face 122 of the annular extension 120 and the outer circumferential surface 116 of the piston friction disk 76 to define a seal between the relatively moveable cover assembly 78 and piston friction disk 76 at the sealing area of the piston friction disk 76. Preferably, the circumferentially extending sealing surface 116 has an annular recess to provide space between the circumferentially extending sealing inner upright section 22 therebetween. In particular, the first side 28 of the center base section 20 is in contact with the radially extending end face 124 of the annular extension 120, the first side 32 of the inner upright section 22 is in contact with the inner circumferential face 122 of the annular extension 120 and the first side 38 of the outer upright section 24 is in contact with the outer circumferential face 123 of the annular extension 120. The second side 34 of the inner upright section 22 is in contact with the circumferentially extending sealing surface 116 of the piston friction disk 76 and the second side 30 of the center base section 20 is in contact with the radially extending sealing surface 118 of the piston friction disk 76.

Figure 8:
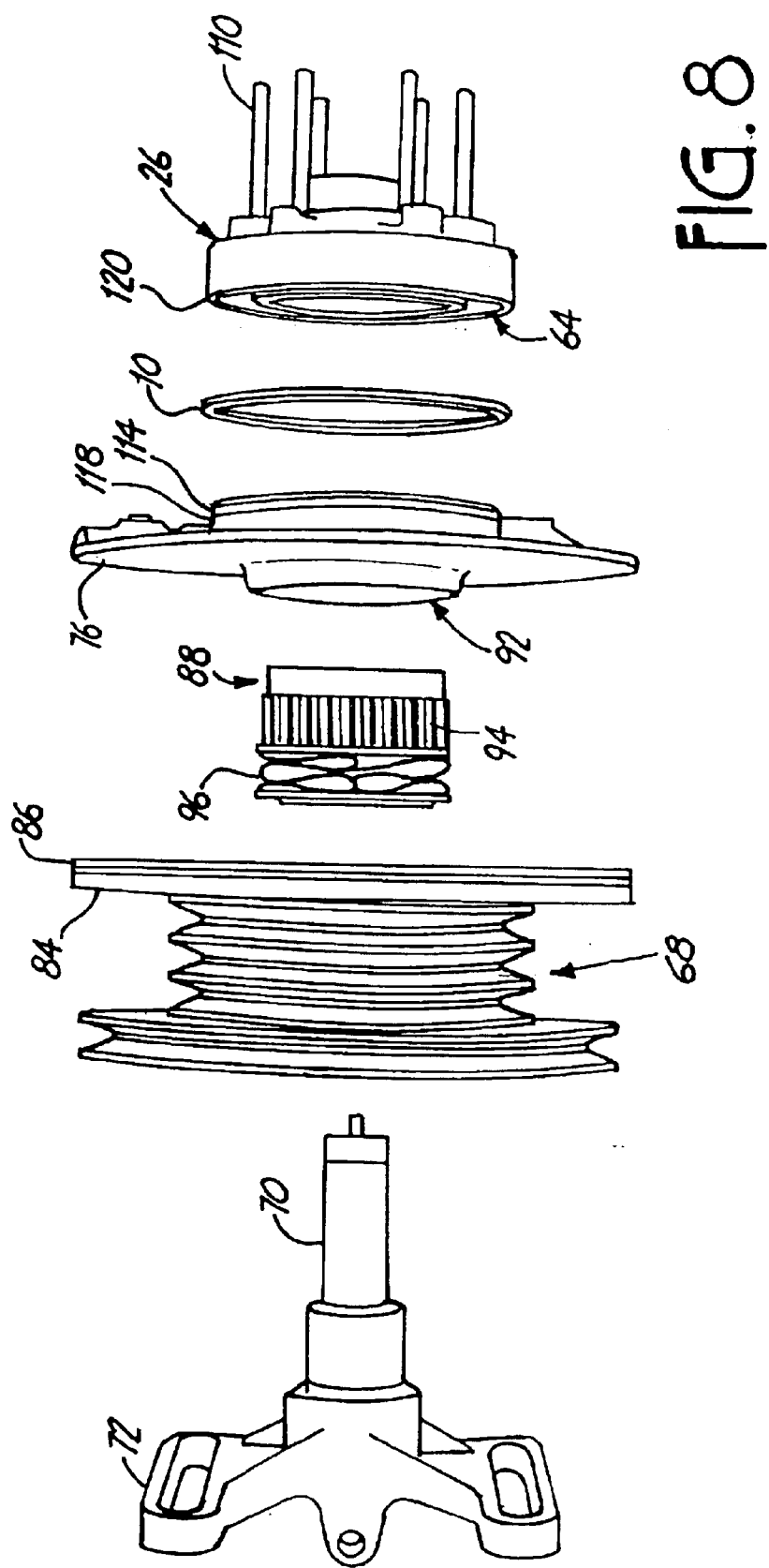
FIG. 8 is an exploded perspective view of another embodiment of a pneumatic on/off fan clutch, with the inventive dust seal, which is provided to further illustrate standard components and relationships.

When the dust seal 10 is disposed between the piston friction disk 76 and cover assembly 78 interface, the annular extension 120 of the cover assembly 78 is disposed in the U-shape 42 of the dust seal 10. The dust seal 10 is elastic and form fitting to the shape of the annular extension 120. To fit the annular extension 120 in the U-shape 42, the outer upright section 24 is deflected away from its angled position, which deforms the outer upright section 24. Deforming the outer upright section 24 causes the outer upright section 24 to exert a force toward the annular extension 120 of the cover assembly 78, thereby insuring that the inner face 48 of the dust seal 10 is always sealed against the annular extension 120 of the cover assembly 78. In addition, the external side 50 of the dust seal 10, which is angled relative to the first axis 58, provides resistance to centrifugal deformation during rotation of the fan clutch 66. As the piston friction disk 76 moves relative to the cover assembly 78, the dust seal 10 tends to move with the piston friction disk 76 while still maintaining a seal between the piston friction disk 76 and the cover assembly interface 78. Without the dust seal 10, portions of the metallic piston friction disk 76 and cover assembly 78 may abrade against each other in use (caused by engine or roadway induced vibrations, etc.) The dust seal 10 thus inhibits such metal-to-metal contact, thereby inhibiting fretting corrosion (i.e. "red rust") caused by such contact which can work its way into the FIG. 8 shows a pneumatic on/off fan clutch 66 in an exploded axial view, further illustrating the inventive dust seal 10 in relation to the other components of the fan clutch 66.

The inventive dust seal 10 provides, both initially and over extended use, an effective means for preventing deterioration of the sealing O-rings 112, 114 in the pneumatic fan clutch 66. The durability of the O-rings 112, 114 are significantly enhanced in view of the harsh on-road conditions faced, over extensive and continuous driving use. The inventive dust seal 10 itself has sufficient durability in such conditions to maintain an effective seal between relative moving components and to prevent exposure of O-rings 112, 114 and other internal components of the fan clutch 66 to undesirable elements.

Although the present invention has been described with reference to preferred embodiments, workers skilled in the art will recognize that changes may be made in form and detail without departing from the spirit and scope of the invention.

What is claimed is:

1. An annular seal disposed about a common axis between two rotatably opposed members for sealing against ingress of foreign matter into a pressure chamber formed between the two members, the seal comprising:
   a center base section having a first inner radial side and a second outer radial side;
   a radially inner upright section extending substantially perpendicular from the center base section; and
   a radially outer upright section having a first inner annular side and a second outer annular side, wherein the first inner annular side of the radially outer upright section extends from the first inner radial side of the center base section at an acute angle.

2. The seal of claim 1, wherein the center base section, the inner upright section and the outer upright section form a generally U-shaped radial cross-section.

3. The seal of claim 1, wherein the outer upright section extends farther away from the inner annular radial side of the base section than the inner upright section.

4. The seal of claim 1, wherein the outer upright section is thicker in radial cross section adjacent the center base section.

5. The seal of claim 1 wherein the center base section, radially inner upright section and radially outer upright section are integrally formed from a flexible polymeric material.

6. The seal of claim 1 wherein the second outer annular side of the radially outer upright section has a rim portion adjacent the center base section which extends substantially perpendicularly to the second outer radial side of the center base section.

7. The seal of claim 1 wherein the ratio of the radial width of the seal along its center base section relative to the radius of the seal, as measured to its outer most radial extent, is about 1:7.

8. The seal of claim 1 wherein the ratio of the axial height of the seal relative to the diameter of the seal is about 1:17.

9. The seal of claim 6 wherein the second outer annular side has an extension portion projecting from the rim portion, the extension portion being aligned at an acute angle relative to the first inner radial side of the center base section, and wherein the extension portion comprises a majority of the second outer annular side.

10. A seal disposed about a first axis between first and second relatively rotating members for sealing against ingress of foreign matter into a pressure chamber formed between the first and second members, wherein the first member has an annular extension and the second member has a radially extending surface, the seal comprising:
    a center base section having a first inner radial side and a second outer radial side;
    a radially inner upright section extending generally perpendicularly from the first inner radial side of the center base section, the inner upright section having a first inner annular side generally facing the center base section first inner radial side, and the inner upright section having a second outer annular side generally facing away from the center base section first inner radial side; and
    a radially outer upright section having a first inner annular side generally facing the center base section first side, and the outer upright section having a second outer annular side generally facing away from the center base section first side, wherein the first inner annular side extends from the center base section first inner radial side at an acute angle;
    wherein the center base section first inner radial side, the inner upright section first inner annular side and the outer upright section first inner annular side collectively form a generally U-shape in radial cross section, and
    wherein the second outer radial side of the center base section is in contact with the radially extending surface of the second member, and the center base section first inner radial side, the inner upright section first inner annular side and the outer upright section first inner annular side are in sealing contact with the annular extension of the first member.

11. The seal of claim 10, wherein the outer upright section extends farther away from the base section than the inner upright section.

12. The seal of claim 10, wherein the outer upright section is thicker in cross section adjacent the center base section.

13. The seal of claim 10, wherein the center base section, radially inner upright section and radially outer upright section are integrally formed from a flexible polymeric material.

14. The seal of claim 10, wherein the second outer annular side of the radially outer upright section has a rim portion adjacent the center base section which extends substantially perpendicularly to the second outer radial side of the center base section.

15. The seal of claim 10, wherein the ratio of the radial width of the seal along its center base section relative to the radius of the seal, as measured to its outermost radial extent, it about 1:7.

16. The seal of claim 10, wherein the ratio of the axial height of the seal relative to the diameter of the seal is about 1:17.

17. The seal of claim 14, wherein the second outer annular side has an extension portion projecting from the rim portion, the extension portion being aligned at an acute angle relative to the first inner radial side of the center base section, and wherein the extension portion comprises a majority of the second outer annular side.

18. A pneumatic fan clutch assembly for a vehicle comprising:
    a sheave rotatable about a first axis, the sheave adapted to be coupled to a driven belt of the vehicle;
    a friction plate connected to the sheave for coupled rotation therewith;
    a friction disk rotatable about the first axis which is axially moveable relative to the friction plate to selectively engage the friction plate, the friction disk having a sealing area thereon defined by a circumferentially extending sealing surface and an adjacent radially extending sealing surface;
    a piston cover assembly connected to the friction disk for coupled rotation therewith about the first axis yet mounted relative to the friction disk for axial movement therebetween, the piston cover assembly having an annular extension thereon which has an inner circumferential face, an outer circumferential face and a radially extending end face; and
    an annular sealing member disposed between the piston cover assembly and the friction disk, the sealing member being flexible and having a generally U-shaped cross-section, with a center base section having a first inner radial side and a second outer radial side, wherein the center base section is disposed between the end face of the annular extension of the piston cover assembly and the radially extending sealing surface of the friction disk, an inner upright section of the annular sealing member disposed between the inner circumferential face of the annular extension and the outer circumferential surface of the friction disk to define a seal between the relatively moveable piston cover assembly and friction disk at the sealing area of the friction disk and an outer upright section of the annular sealing member having a first inner annular side and a second outer annular side, wherein the first inner annular side extends from the first inner radial side of the center base section at an acute angle and at least a portion thereof engages in a sealing relation, the outer circumferential face of the annular extension of the piston cover assembly.

19. The seal of claim 18, wherein the outer upright section extends farther away from the inner annular radial side of the base section than the inner upright section.

20. The seal of claim 18, wherein the outer upright section is thicker in radial cross section adjacent the center base section.

21. The seal of claim 18, wherein the center base section, the inner upright section and the outer upright section are integrally formed from a flexible polymeric material.

22. The seal of claim 18, wherein the second outer annular side of the outer upright section has a rim portion adjacent the center base section which extends substantially perpendicularly to the second outer radial side of the center base section.

23. The seal of claim 18, wherein the ratio of the radial width of the seal along its center base section relative to the radius of the seal, as measured to its outermost radial extent, is about 1:7.

24. The seal of claim 18, wherein the ratio of the axial height of the seal relative to the diameter of the seal is about 1:17.

25. The seal of claim 22 wherein the second outer annular side has an extension portion projecting from the rim portion, the extension portion being aligned at an acute angle relative to the first inner side of the center base section, and wherein the extension portion comprises a majority of the second outer annular side.

26. A piston housing assembly for use on a pneumatic fan clutch of the type having a piston housing with an annular extension thereon which is axially moveable relative to a radially extending surface on a piston friction disk, wherein the annular extension has an inner circumferential face and an outer circumferential face, with the inner and outer circumferential faces joined by a radially extending annular end face, the improvement which comprises:

an annular seal mounted on the annular extension, the seal having a generally U-shape radial cross-section defined by a center base section, a inner upright section and a outer upright section, the center base section having a first inner radial side and a second outer radial side, wherein the center base section extends radially between the annular end face of the annular extension and the radially extending surface, the inner upright section extending substantially perpendicularly from the center base section along the inner circumferential face of the annular extension, and the outer upright section having a first inner annular side and a second outer annular side, wherein the first inner annular side extends from the first inner radial side of the center base section at an acute angle and has at least a portion thereof engaging, in sealing relation, the outer circumferential face of the annular extension.

27. The seal of claim 26, wherein the outer upright section extends farther away from the inner annular side of the base section than the inner upright section.

28. The seal of claim 26, wherein the outer upright section is thicker in radial cross section adjacent the center base section.

29. The seal of claim 26, wherein the center base section, the inner upright section and the outer upright section are integrally formed from a flexible polymeric material.

30. The seal of claim 26, wherein the second outer annular side of the outer upright section has a rim portion adjacent the center base section which extends substantially perpendicularly to the second outer radial side of the center base section.

31. The seal of claim 26, wherein the ratio of the radial width of the seal along its center base section relative to the radius of the seal, as measured to its outermost radial extent, is about 1:7.

32. The seal of claim 26, wherein the ratio of the axial height of the seal relative to the diameter of the seal is about 1:17.

* * * * *

UNITED STATES PATENT AND TRADEMARK OFFICE
CERTIFICATE OF CORRECTION

PATENT NO. : 6,811,011 B2
DATED : November 14, 2004
INVENTOR(S) : Charles M. Bastien It is certified that error appears in the above-identified patent and that said Letters Patent is hereby corrected as shown below:

Column 5,
Line 41, delete "114 moisture", insert -- 114 is the most likely seal to be exposed to external conditions (e.g., moisture, --

Column 6,
Line 12, delete "sealing inner", insert -- sealing surface 116 has an annular recess to provide space between the circumferentially extending sealing surface 116 and the inner --
Line 60, after "the", insert -- O-rings 112, 114. --

Signed and Sealed this

Fifth Day of April, 2005

JON W. DUDAS
*Director of the United States Patent and Trademark Office*